US008707807B2

(12) United States Patent
Yadav et al.

(10) Patent No.: US 8,707,807 B2
(45) Date of Patent: Apr. 29, 2014

(54) PARTICULATE FILTER DIAGNOSTICS (75) Inventors: Pranati Yadav, La Grange Park, IL (US); Phanindra Garimella, Bloomington, IN (US); Joan M. Wills, Nashville, IN (US); Daniel R. Hashbarger, Columbus, IN (US); Ross C. Berryhill, Nashville, IN (US); Dean H. Dringenburg, Seymour, IN (US)

(73) Assignee: Cummins Inc., Columbus, IN (US)

( * ) Notice: Subject to any disclaimer, the term of this patent is extended or adjusted under 35 U.S.C. 154(b) by 109 days.

(21) Appl. No.: 13/166,538

(22) Filed: Jun. 22, 2011

(65) Prior Publication Data

US 2012/0125081 A1 May 24, 2012

Related U.S. Application Data (60) Provisional application No. 61/357,245, filed on Jun. 22, 2010.

(51) Int. Cl.
*G01M 15/10* (2006.01)
(52) U.S. Cl.
USPC ........................................................ 73/865.9
(58) Field of Classification Search
None
See application file for complete search history.

(56) References Cited

U.S. PATENT DOCUMENTS

| | | | |
|---|---|---|---|
| 5,651,248 A | 7/1997 | Kawamura | |
| 6,947,831 B2 | 9/2005 | Van Nieuwstadt | |
| 7,024,950 B2 | 4/2006 | Gulti et al. | |
| 7,266,943 B2 | 9/2007 | Kammel | |
| 7,278,304 B2 | 10/2007 | Zanini-Fisher et al. | |
| 7,284,366 B2 | 10/2007 | Kurtz | |
| 7,406,855 B2 | 8/2008 | Tikkanen et al. | |
| 7,497,138 B2 | 3/2009 | Kubinski et al. | |
| 7,526,950 B2 | 5/2009 | Van Nieuwstadt et al. | |
| 7,581,389 B2 | 9/2009 | Crawley et al. | |
| 7,721,528 B2 | 5/2010 | Otajma et al. | |
| 7,870,779 B2 * | 1/2011 | Lattin et al. | 73/114.69 |
| 8,327,696 B2 * | 12/2012 | Baars et al. | 73/114.69 |
| 2006/0260299 A1 | 11/2006 | Wang et al. | |
| 2010/0005784 A1 | 1/2010 | Bird et al. | |
| 2010/0101409 A1 | 4/2010 | Bromberg et al. | |

OTHER PUBLICATIONS

International Search Report and Written Opinion, PCT/US2011/041475, ISA/US, Cummins Inc., Nov. 2, 2011.

* cited by examiner

*Primary Examiner* — Robert R Raevis
(74) *Attorney, Agent, or Firm* — Krieg DeVault LLP (57) ABSTRACT A system includes an internal combustion engine producing an exhaust stream, a particulate filtering device that treats the exhaust stream, a particulate sensor operatively coupled to the exhaust stream at a position downstream of the particulate filtering device, and a temperature sensor operatively coupled to the exhaust stream. The system includes a controller that interprets a particulate sensor particulate stability condition, interprets a particulate sensor input value and a particulate sensor temperature, compensates the particulate sensor input value in response to the particulate sensor temperature, and filters the compensated particulate sensor input value. The controller determines a soot accumulation value in response to the filtered compensated particulate sensor input value, interprets a diagnostic enable condition, and determines a particulate filter diagnostic value in response to the active diagnostic enable condition and the soot accumulation value. The controller provides the particulate filter diagnostic value to an output device.

29 Claims, 6 Drawing Sheets

PARTICULATE FILTER DIAGNOSTICS

RELATED APPLICATIONS

This application is related to, and claims the benefit of, U.S. Provisional Patent Application 61/357,245 filed on Jun. 22, 2010, entitled "DIESEL PARTICULATE FILTER DIAGNOSTICS," which is incorporated herein by reference in the entirety for all purposes.

BACKGROUND

Available techniques for particulate filter diagnostics suffer from a number of disadvantages, drawbacks and inadequacies including an inability to adequately diagnose particulate filter loading and loss of filtration efficiency among others. There are significant unmet needs for improved exhaust emissions solutions including improvements to particulate filter diagnostics.

SUMMARY

An exemplary embodiment includes a technique which uses a particulate matter sensor whose output is based on the accumulation of particulate matter (PM) on a sensing element leading to a signal proportional to, or otherwise a function of, the amount of soot at the outlet of a particulate filter. A particulate sensor senses accumulation of particulate matter that has not been caught in the particulate filter and it outputs a signal produced as a function of the amount of soot accumulated on the sensing element. The particulate sensor is mounted in the exhaust flow stream downstream of the particulate filter. The particulate filter may be positioned either up-stream or down-stream of a $NO_x$ after-treatment system, where $NO_x$ after-treatment is present.

The signal from the sensor can be a current, voltage or resistance which is a function of the amount of particulate matter accumulated on a sensing element. In certain forms a particulate sensor includes resistance between the sensor electrodes decreasing with soot accumulating on the sensor element. The particulate sensor may further include a parallel resistor to the sensor element that caps the output of the sensor. The state of the particulate filter is determined using the sensor output signal in addition to the temperature and flow velocity of the exhaust stream. These signals along with various compensations, filtering and enable conditions are used as the mechanism for detecting the loss of filtering efficiency of the particulate filter.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the illustrated embodiments, and any further applications of the principles of the invention as illustrated therein as would normally occur to one skilled in the art to which the invention relates are contemplated herein.

Figure 1:
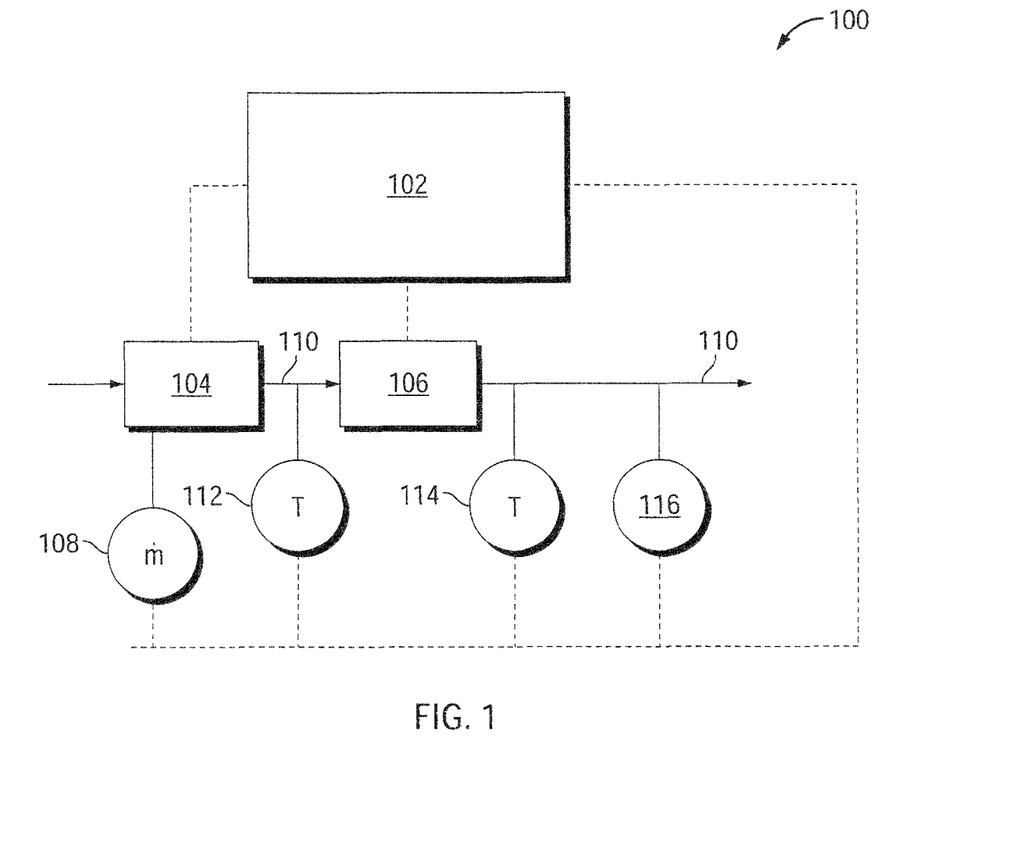
FIG. 1 is a schematic diagram of a system for diagnosing a particulate filter.

Referencing FIG. 1, a system 100 includes an engine 104 producing an exhaust stream 110 having soot and/or particulates. The system 100 includes a particulate filtering device 106—for example a diesel particulate filter (DPF)—or any other type of particulate filter. The exhaust stream 110 passes through the particulate filter 106. Downstream of the filter 106, the system 100 includes a particulate sensor 116 operatively coupled to the exhaust stream 110 at a position downstream of the particulate filter 106. The particulate sensor 116 is an integrating type sensor which provides an output that is a function of accumulated soot on the sensing element and is periodically regenerated to remove particulates from the sensing element. Hence the sensor resistance (between its electrodes) decreases as soot accumulates on the sensor element placed in the exhaust downstream of filter 106.

When the sensor signal reaches a pre-determined threshold which is based on criteria such as the operating conditions, information from the manufacturer, or as a design decision based on the lowest desired resistance value from the particulate sensor 116, the sensor element regenerates and removes the particulates from the sensor. An exemplary sensor 116 includes a controllable heating element to perform the regeneration actively and at a selected time.

The system 100 further includes a controller 102 structured to perform certain operations to diagnose the particulate filter 106. In certain embodiments, the controller 102 forms a portion of a processing subsystem including one or more computing devices having memory, processing, and communication hardware. The controller 102 may be a single device or a distributed device, and the functions of the controller 102 may be performed by hardware or software. In certain embodiments, the controller 102 includes one or more modules structured to functionally execute the operations of the controller. An exemplary controller 102 includes a particulate stability module that interprets a particulate sensor stability condition, a particulate sensor processing module that filters and compensates a particulate sensor input value, a particulate determination module that determines a soot accumulation value, a diagnostic screening module that interprets a diagnostic enable condition, and a particulate sensor diagnostic module that determines a particulate filter diagnostic value. More specific descriptions of certain embodiments of controller operations are included in the section referencing FIG. 2.

Modules may be implemented in hardware and/or software on computer readable medium, and modules may be distributed across various hardware or software components. The description herein including modules emphasizes the structural independence of the aspects of the controller, and illustrates one grouping of operations and responsibilities of the controller. Other groupings that execute similar overall operations are understood within the scope of the present application.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

The controller 102 is in communication with any component of the system to gather information and provide commands. The controller includes stored data values, constants, and functions, as well as operating instructions stored on computer readable medium. Any of the operations of exemplary procedures described herein may be performed at least partially by the controller.

The system 100 further includes a temperature sensor 112 that determines a temperature of the exhaust stream 110. The temperature sensor 112 may be a physical sensor or a virtual sensor, and the temperature of the exhaust stream 110 may be determined at any position within the exhaust stream 110, including upstream or downstream of the filter 106. The system 100 further includes a temperature sensor 114 positioned in proximity to the particulate sensor 116. The temperature sensor 114 provides a temperature determination of the sensor element. The temperature sensor 114 may be physical or virtual, and may be included within the particulate sensor 116 or provided as a communicated value from the particulate sensor 116.

The system 100 further includes an exhaust flow sensor 108, illustrated as a mass flow sensor. The exhaust flow sensor 108 may be an actual mass flow sensor or a virtual sensor— for example determined according to an engine speed, displacement volume, and volumetric efficiency under present operating conditions. The system 100 may include an EGR flow (not shown), and the mass flow sensor 108 may account for the EGR flow (e.g. during transient operating conditions) or the EGR flow may be ignored in determining the mass flow (e.g. during steady state operating conditions). Any one or more of the illustrated sensors are optional, and may not be present in certain embodiments of the system 100, and/or may be present in different positions from the illustrated positions. Likewise, additional sensors not shown may be present for specific embodiments of the present invention.

Figure 2:
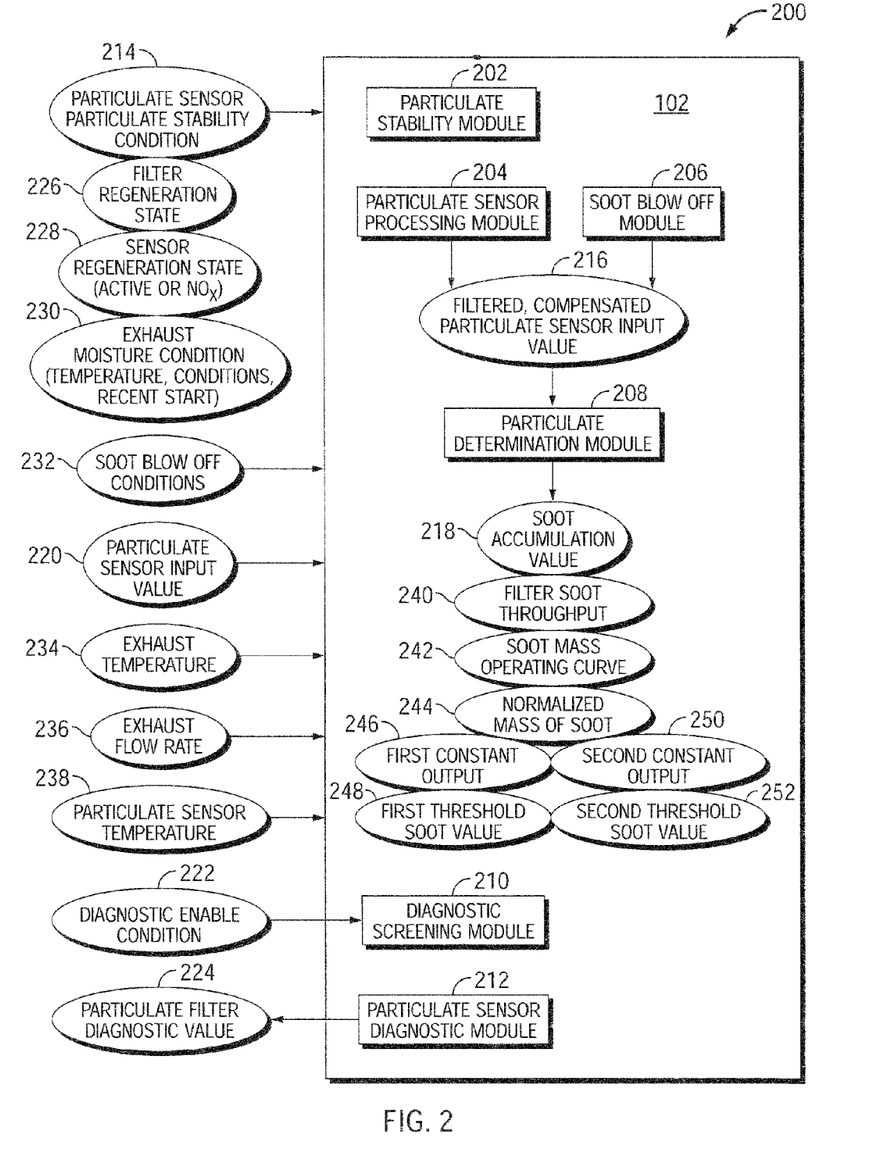
FIG. 2 is a schematic diagram of a processing subsystem including a controller for diagnosing a particulate filter.

Referencing FIG. 2, an exemplary controller 102 includes modules for executing certain operations to diagnose a particulate filter. The controller 102 includes a particulate stability module 202 that interprets a particulate sensor particulate stability condition 214. An exemplary particulate sensor particulate stability condition 214 includes a filter regeneration state 226 indicating that the particulate filter is not regenerating. When the particulate filter is regenerating, oxidized soot and other material can exit the particulate filter, potentially obfuscating the correct soot reading from the particulate filter. The determination of the filter regeneration state 226 may be express (e.g. communicated by an engine controller) and/or implied (e.g. temperature and oxygen conditions of the exhaust stream are sufficient to regenerate the particulate filter).

Another exemplary particulate sensor particulate stability condition 214 includes determining that the particulate sensor regeneration state 228 is not regenerating. The determination of the particulate sensor regeneration state 228 may likewise be express or implied. For example, the particulate sensor may communicate that a sensor regeneration event is occurring. In another example, the temperature and oxygen content of the exhaust stream at the particulate sensor may be sufficient to provide regeneration of the sensor. In yet another example, the amount of $NO_x$ in the exhaust stream, as well as the current temperature at the particulate sensor may be sufficient that passive regeneration of the sensor due to $NO_x$ ("noxidation") is presently occurring.

Another exemplary particulate sensor particulate stability condition 214 includes determining that an exhaust moisture condition 230 is not present. In certain embodiments, the determination that an exhaust moisture condition 230 is not present includes determining that a predetermined wait time has elapsed since a vehicle key-on event and/or an engine start event has occurred. An exemplary embodiment includes determining that an exhaust moisture condition 230 is not present in response to a temperature of the exhaust stream reaching a threshold value—for example, and without limitation, greater than 100° C.

The exemplary controller 102 further includes a particulate sensor processing module 204 that interprets a particulate sensor input value 220 and a particulate sensor temperature 238, and compensates the particulate sensor input value 220 in response to the particulate sensor temperature 238. The particulate sensor processing module 204 also filters the compensated particulate sensor input value to provide a filtered, compensated particulate sensor input value 216.

The controller 102 further includes a particulate determination module 208 that determines a soot accumulation value 218 in response to the filtered compensated particulate sensor input value 216. An exemplary particulate determination module 208 determines the soot accumulation value 218 in response to the filtered compensated particulate sensor input value 216 by determining a filter soot throughput 240 as a function of the filtered compensated particulate sensor input value 216. Another exemplary particulate determination module 208 determines the filter soot throughput 240 as a normalized mass of soot 244, for example by determining a soot mass operating curve 242 as a function of an exhaust flow velocity (rate) 236 and an exhaust temperature 234. The particulate determination module 208 further determines the filter soot throughput 240 in response to the filtered compensated particulate sensor input value 216 and the soot mass operating curve 242.

In certain embodiments, the soot mass operating curve 242 provides a first constant output 246 in response to an amount of soot on the particulate sensor being lower than first threshold soot value 248. In certain embodiments, a resistor having a specified resistance value is wired in parallel with the particulate sensor. The specified resistance value is selected such that the soot mass operating curve provides an output lower than the first constant output at a soot loading value on the particulate sensor that is below a failed particulate filter soot loading value. The resistance of the parallel system of the sensor element and the resistor follows the formula $$\frac{1}{R_{tot}} = \frac{1}{R_{sensor}} + \frac{1}{R_{resistor}}.$$

The first constant output 246 can be selected to be any arbitrarily high fraction of the $R_{resistor}$ value, for example an $R_{tot}$ that is 95% of the $R_{resistor}$ value.

Accordingly, when the amount of soot that is deposited on the particulate sensor is known, then the $R_{sensor}$ value that provides an $R_{tot}$ that is the desired fraction (or other value or small range of values determined to be a "constant output") of the $R_{sensor}$ value is readily determined. In one example, if a properly functioning particulate filter will keep the particulate sensor above a resistance of 100 kΩ, and the values of at least 90% of the $R_{sensor}$ value are determined to be the "constant output" values, then the exemplary $R_{sensor}$ value would be (solving $$\left(\text{solving } \frac{1}{0.9 * R_{sensor}} = \frac{1}{100k} + \frac{1}{R_{sensor}}\right)$$

about 11,100Ω. An exemplary $R_{sensor}$ value is about 7,000,000Ω. An exemplary sensor element, when fully loaded with soot before regenerating, provides an output resistance of about 100,000Ω. The sensor resistance values at high and low soot loadings may be any values as provided by a manufacturer. Additionally or alternatively, a series resistor may be placed on the sensor elements to adjust or limit the observed resistance on the sensor at the lower limit.

In certain further embodiments, the soot mass operating curve 242 provides a second constant output 250 in response to the amount of soot on the particulate sensor being greater than a second threshold soot value 252.

The exemplary controller 102 further includes a diagnostic screening module 210 that interprets a diagnostic enable condition 222.

The controller 102 further includes a particulate sensor diagnostic module 212 that determines a particulate filter diagnostic value 224 in response to the active diagnostic enable condition 222 and the soot accumulation value 218, and provides the particulate filter diagnostic value 224 to an output device. The operation to provide the particulate filter diagnostic value to an output device includes, without limitation, providing a command or electrical output to a malfunction indicator light, saving an error message to a nontransient memory location, saving a fault code to a nontransient memory location, and/or providing a communication to a datalink or network.

In certain embodiments, the controller 102 further includes a soot blowoff module 206 that interprets soot blowoff conditions 232. The particulate sensor processing module 204 further compensates the particulate sensor input value 220 in response to the soot blowoff conditions 232. Exemplary soot blowoff conditions 232 include a rapid transient of the engine flow rate, a rapid transient of the engine flow rate coupled with a step change or rapid change in the particulate sensor input value 220, and/or a step change or rapid change in the particulate sensor input value 220 that is beyond an expected change (e.g. due to regeneration modeling or other estimating techniques).

Figure 4:
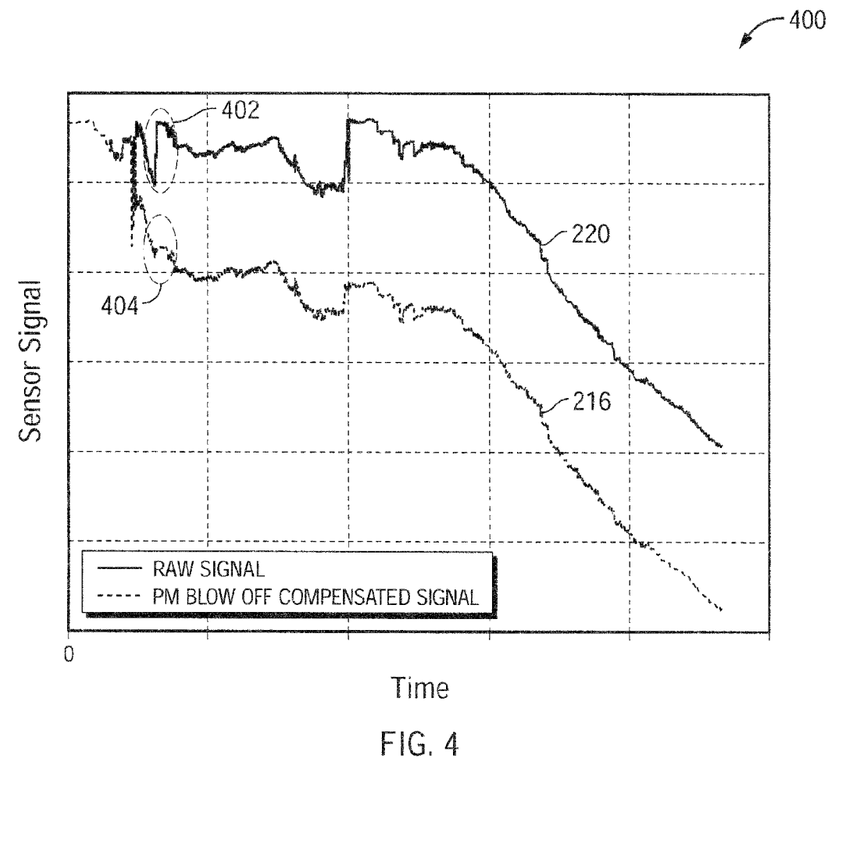
FIG. 4 is a depiction of illustrative data of a compensated signal.

Referencing FIG. 4, illustrative data 400 of an exemplary particulate sensor input value 220 and a compensated particulate sensor input value 216 for soot blowoff are shown. In one example, at 402 a large increase in the sensor signal is observed that cannot be explained by regeneration under the present conditions. At 404 the compensated sensor signal is held at a level consistent with the prior soot loading value. In certain embodiments, the compensation is provided as a percentage change of the sensor signal, and/or as an offset value. In certain embodiments, the soot blowoff compensation is held throughout the diagnostic test, and in certain embodiments in response to a soot blowoff event, or a soot blowoff compensation exceeding a specified value the diagnostic test is canceled in response to the soot blowoff event.

Additional or alternative soot blow off compensation includes determining whether an exhaust flow rate transient event greater than a transient threshold, and compensating the raw sensor signal by freezing the particulate sensor input value during and for a period following the transient, increasing a filter time constant of the particulate sensor input value (preventing a rapid reset of the sensor signal), and/or providing an offset to the particulate sensor input value. In certain embodiments, soot blowoff compensation may be made when the temperature is not at a regenerating temperature and the sensor signal indicates that the amount of soot on the sensor is being reduced, indicating that a reduced amount of soot is likely due to blow off. In certain further embodiments, the compensation operation includes determining if a raw particulate sensor input value has changed greater than a threshold amount within less than a threshold time, and then reducing and/or eliminating the change in the raw particulate sensor input value. Where the conditions do not suggest the large soot reduction can be due to active regeneration of the sensor element or passive regeneration of the sensor element due to present exhaust conditions, the compensation reduces the estimated soot reduction (i.e. simulates a higher soot loading, or a lower sensor output resistance) by compensating the raw sensor signal 220 as illustrated in the blowoff compensated signal 216.

Figure 3:
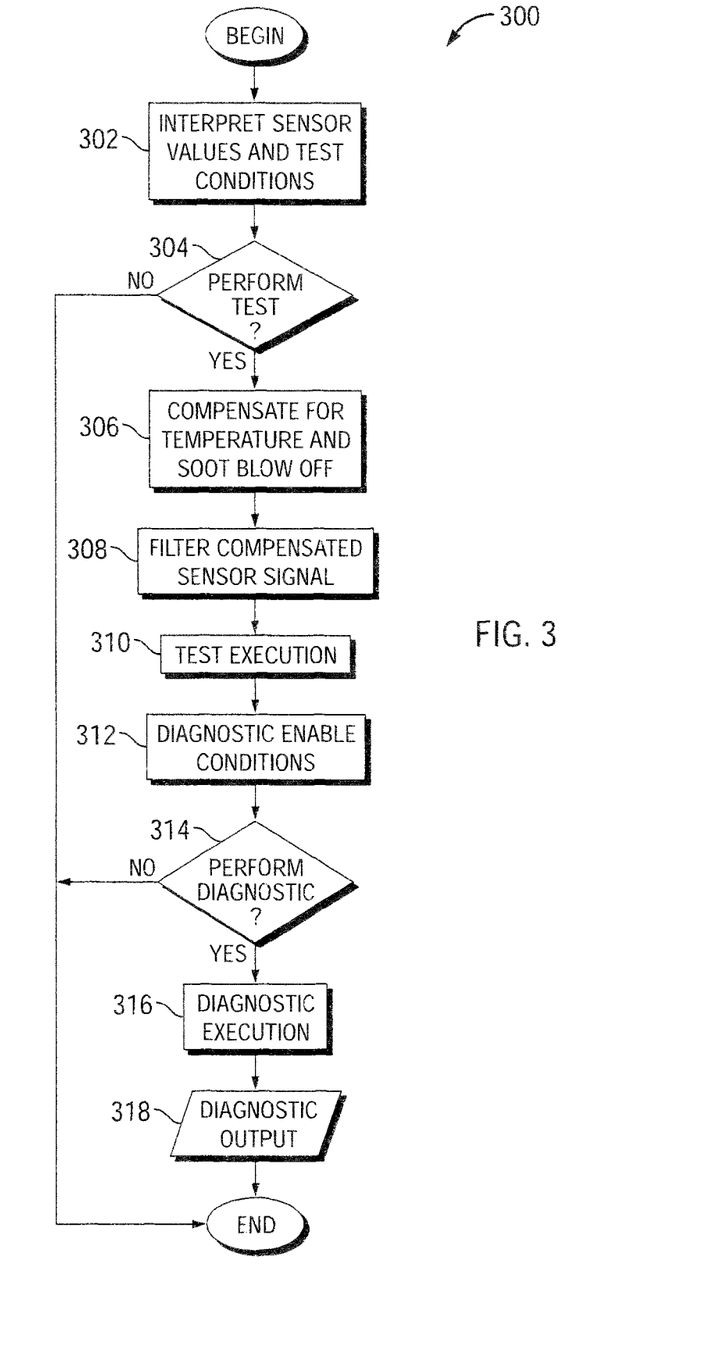
FIG. 3 is a schematic flow diagram of a procedure for diagnosing a particulate filter.

The schematic flow diagram in FIG. 3 and related descriptions which follow provide illustrative embodiments of performing procedures for on-board diagnostics of a particulate filter using a particulate sensor. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure 300 includes an operation 302 to interpret sensor values and test conditions, and to determine whether a particulate sensor particulate stability condition is present. An exemplary operation 302 includes determining a particulate sensor input value. The procedure 300 includes an operation 304 to determine whether to perform the test of the particulate filter, for example in response to a particulate sensor particulate stability condition being TRUE, or the stability conditions being present. The procedure 300 further includes an operation 306 to compensate the particulate sensor input value. The operation 306 is an operation to compensate for temperature and/or for soot blow off. The procedure 300 further includes an operation 308 to filter the compensated sensor signal.

The procedure 300 further includes an operation to perform the test execution. An exemplary operation 310 includes determining a soot accumulation value in response to the filtered compensated particulate sensor input value. The procedure 300 further includes an operation 312 to determine whether diagnostic enable conditions are present. Diagnostic enable conditions include, in certain embodiments, a check to ensure NOx based regeneration of the particulate filter and/or particulate sensor is not presently occurring, that a fault in the system is not present, and/or any other condition wherein the accumulated soot value determined by the operation 310 should not be utilized to set a fault or other failure indication.

The procedure 300 further includes, in response to an operation 314 determining the diagnostic enable conditions are present, an operation 316 to perform the diagnostic execution, for example by determining a particulate filter diagnostic value in response to the soot accumulation value. Exemplary soot accumulation values include an amount of soot deposited on the particulate sensor over a specified period of time, a deposition rate of the soot on the particulate sensor over a specified period of time, and/or a number of times that the particulate sensor regenerates during the period of the diagnostic test. The procedure 300 further includes an operation 318 to provide the particulate filter diagnostic value to an output device.

In certain embodiments of the procedure 300, the particulate sensor input value is a resistance, a voltage, and/or a current indicative of an amount of soot accumulated on a particulate sensor element. In certain embodiments of the procedure 300, the operation 304 to determine whether the particulate sensor particulate stability condition is present includes determining that a particulate filter is not regenerating, determining that the particulate sensor providing the particulate sensor input value is not regenerating, determining that the particulate sensor providing the particulate sensor input value is not regenerating due to a $NO_x$ mechanism, determining that a predetermined wait time has elapsed since one of a vehicle key-on event and an engine start event, and/or determining that an exhaust moisture condition is not present.

In certain embodiments, the operation 306 to compensate the particulate sensor input value includes one or more of the following operations. An exemplary compensation operation 306 includes determining whether an exhaust flow rate transient event greater than a transient threshold has occurred, and freezing the particulate sensor input value in response to the exhaust flow rate transient event. Another exemplary operation 306 includes determining whether the exhaust flow rate transient event greater than the transient threshold has occurred, and increasing a filter time constant of the particulate sensor input value in response to the exhaust flow rate transient event. Yet another exemplary operation 306 includes determining whether the exhaust flow rate transient event greater than the transient threshold has occurred, and providing an offset to the particulate sensor input value in response to the exhaust flow rate transient event. Still another exemplary operation 306 includes determining if an unfiltered particulate sensor input value experiences an anomalous change in response to the unfiltered particulate sensor input value changing than an anomaly threshold amount within less than an anomaly threshold time, and providing an apparent unfiltered particulate sensor input value in response to the anomalous change, where the apparent unfiltered particulate sensor input value is an unfiltered particulate sensor input value with a reduced change value and/or the unfiltered particulate sensor input value with an eliminated change value. The presence of an anomaly is determined according to an estimated increase or decrease value of the sensor output based on current operating conditions of the system.

Another exemplary operation 306 includes adjusting a sensor output function in response to an exhaust temperature and/or a sensor element temperature, where the sensor output function includes an amount of soot as a function of the raw particulate sensor input value. Yet another exemplary operation 306 includes determining an amount of soot oxidized by $NO_x$ (noxidation), and providing a noxidation compensated particulate sensor input value in response to the noxidation, where the noxidation compensated particulate sensor input value includes the particulate sensor input value frozen at a previous value, the particulate sensor input value determined with an increased filter time constant, and the particulate sensor input value provided with a noxidation offset value.

An exemplary operation 308 to filter the compensated sensor signal includes filtering the compensated particulate sensor input value comprises filtering with a low-pass filter having frequency characteristics determined as a function of exhaust flow velocity and exhaust gas temperature. Another exemplary operation 308 includes filtering the compensated sensor signal with a moving average of sensor values, a rolling buffer of sensor values, or any other filtering operation understood in the art.

Various exemplary operations 310 to determine the soot accumulation value in response to the filtered compensated particulate sensor input value are described following. An exemplary operation 310 includes counting a number of particulate sensor regeneration events that occur during a specified period of time or a specified testing period, counting a number of particulate sensor temperature excursions that occur during a specified period of time or a specified testing period, counting a number of particulate sensor threshold value events that occur when the particulate sensor temperature is between an upper threshold and a lower threshold during a specified period of time or a specified testing period, and/or determining whether a minimum time elapses without a particulate sensor regeneration event occurring.

Figure 5:
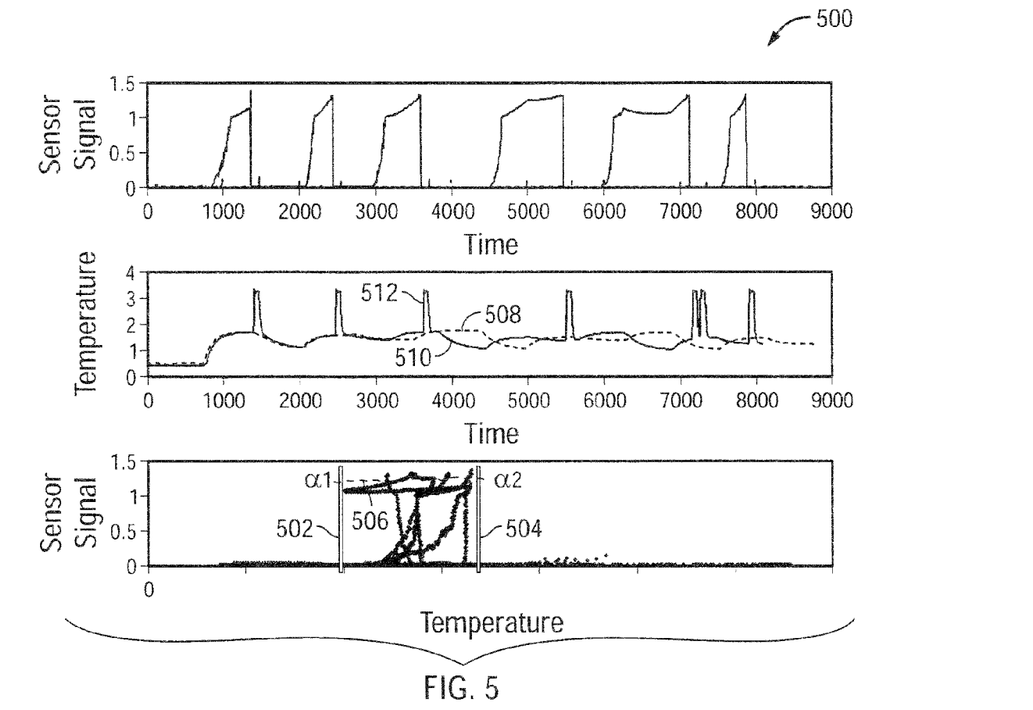
FIG. 5 is a depiction of illustrative sensor data.

For example, referencing FIG. 5, an exemplary sensor data plot is illustrated. Referencing the lowest plot, the operation 310 determines that a temperature is between a lower threshold 502 and an upper threshold 504. While the sensor temperature is between the thresholds 502, 504, a number of sensor regeneration events are determined. The sensor regeneration events are determined by any method understood in the art, but may be determined according to a number of temperature excursions 512 of the sensor temperature 510, and/or according to a number of times the sensor output value exceeds a threshold value 506 and returns below the threshold 506 (indicating a regeneration clearing the soot from the sensor element). The signals of the sensor in FIG. 5 are shown to correspond to soot loading, which may be the opposite of the electrical signal from the sensor (e.g. where the resistance increases with lower soot loading). The curve 508 is shown in the exemplary data 500 for reference, the curve 508 showing the exhaust temperature.

Figure 7:
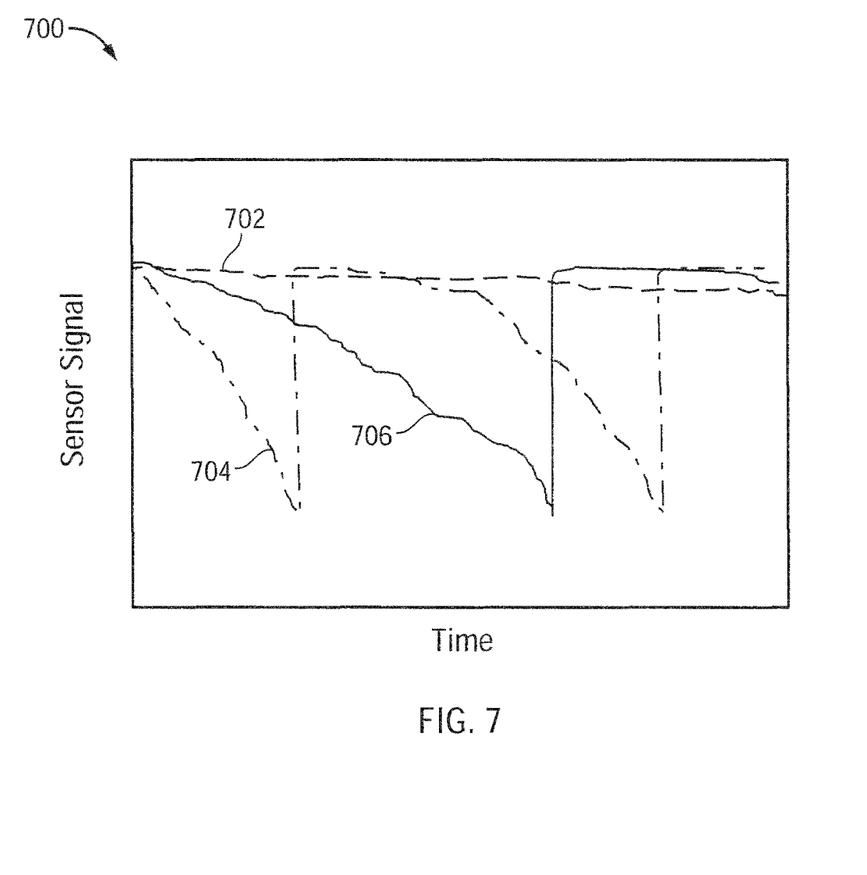
FIG. 7 is a depiction of illustrative sensor signal versus time data.

Referencing FIG. 7, illustrative data showing a sensor signal over time is depicted. The curve 702 shows nominal sensor signal versus time data, where the sensor signal remains relatively constant over time. The curve 702 is consistent with a properly functioning particulate filter. The curve 704 shows the sensor signal over time with a severely degraded or failed particulate filter. The sensor accumulates significant signal change as soot builds up on the sensor. The slope of the curve 704 can be determined and compared to a predetermined failed or degraded slope value. The curve 706 shows the sensor signal over time with a degraded particulate filter, which may be a failed filter depending upon the emissions regulation environment and the amount of particulates required in the exhaust pipe of the relevant size to produce the soot deposition rate of the curve 706. The slope of the curve 706 may be compared to predetermined data to determine whether the particulate filter is still performing acceptably. The curves 702, 704, 706 can additionally or alternatively be utilized as any accumulation parameter, including a slope value, a deposition rate of soot on the sensor, and/or an amount of soot accumulated within a specified time. Any of the accumulation parameters may be readily correlated to a failed particulate filter in testing and used to identify a failed particulate filter during the operation 310.

An exemplary operation 310 includes determining a soot accumulation value in response to the filtered compensated particulate sensor input value by determining whether a rate of change of the filtered compensated particulate sensor input value is greater than a conforming filter threshold value. A further exemplary operation 310 includes the rate of change of the filtered compensated particulate sensor input value including a rate of change selected from an averaged rate of change over a specified period of time, an instantaneous rate of change, a filtered instantaneous rate of change, and/or a maximum rate of change observed during a specified period of time.

Another exemplary operation 310 includes determining a soot accumulation value in response to the filtered compensated particulate sensor input value by determining a soot throughput of a particulate filter as a function of the filtered compensated particulate sensor input value. In certain embodiments, the throughput includes a normalized mass of soot, for example a soot rate adjusted for a pipe diameter of the system. Referencing FIG. 6, an exemplary operation 310 includes determining the soot throughput as a normalized mass of soot 244 by determining a soot mass operating curve 242 as a function of an exhaust flow velocity and an exhaust temperature. The operation 310 further includes determining the soot throughput in response to the filtered compensated particulate sensor input value 216 and the soot mass operating curve 242. An exemplary operation further includes the soot mass operating curve 242 provides a first constant output 246 in response to an amount of soot on the particulate sensor being lower than first threshold soot value 248.

Figure 6:
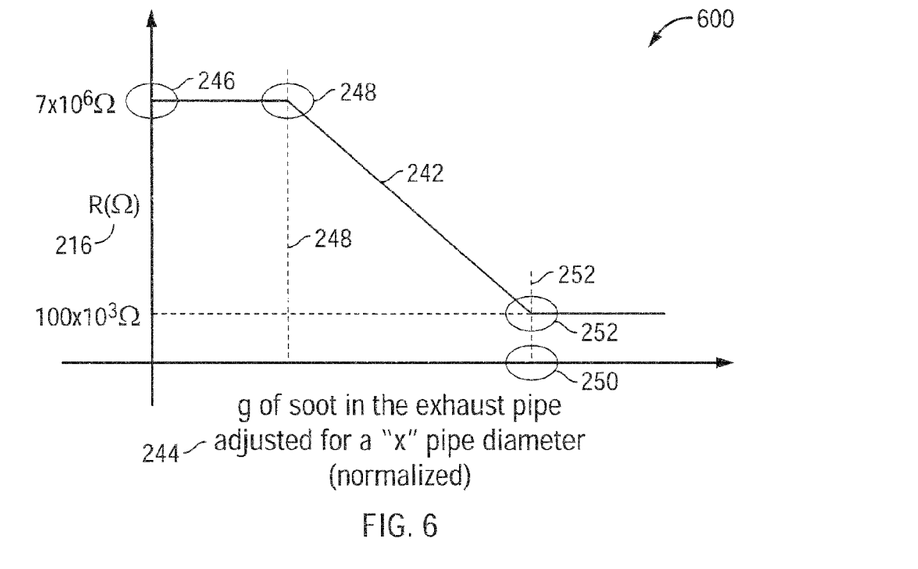
FIG. 6 is an illustrative depiction of threshold values.

An exemplary method to provide the first constant output 246 at a low soot loading includes determining a specified resistance value, and wiring a resistor having the specified resistance value in parallel with the particulate sensor. An exemplary operation to determine specified resistance value includes determining a resistance value such that the soot mass operating curve 242 provides an output lower than the first constant output 246 (i.e. the soot mass operating curve 242 begins the down slope portion of the curve) at a soot loading value on the particulate sensor that is below a failed particulate filter soot loading value. In certain embodiments, the specified resistance value is selected such that a failed particulate filter provides sufficient soot on the particulate sensor that normalized mass of soot 244 reaches the second threshold soot value 252, and such that a particulate filter that is not failed may exceed the first threshold soot value 248 but does not exceed the second threshold soot value 252. In certain embodiments, the soot mass operating curve 242 provides a second constant output 250 in response to the amount of soot on the particulate sensor being greater than the second threshold soot value 252. The second constant output may be provided by a resistor in series with the particulate sensor elements.

Another exemplary procedure for on-board diagnostics of a particulate filter is described. The procedure includes an operation to determining whether a set of test enable conditions are active. The set of test enable conditions includes determining whether one or more conditions are present that unacceptably increase the signal-to-noise ratio of a particulate sensor or that cause a false detection of a particulate filter failure. Exemplary test enable conditions include determining that the particulate filter is not currently regenerating, such as performing a high temperature oxidation regeneration or an elevated $NO_2$-based $NO_x$ oxidation ("noxidation") regeneration. Further test enable conditions include determining that the particulate sensor is not performing a periodic regeneration event, determining that an amount of time has passed since a vehicle key-on event or since an engine start event such that the engine is expected to be warm and nominally operating before enabling the test.

The exemplary procedure further includes determining a particulate sensor input value, which includes periodically determining the particulate sensor input value during the test. The particulate sensor input value is a voltage, current, and/or resistance of the sensor in response to an accumulated amount of soot on the sensor. An exemplary sensor exhibits a change in resistance or voltage as soot accumulates on the sensor. When the soot accumulates to a threshold level, the sensor self-heats and oxidizes the soot. The sensor or other control elements may further count the regeneration event and increment a soot counter by the threshold amount of soot. Certain systems may include a parallel and/or a series resistor with the sensor. For example, referencing FIG. 6, a high resistance may be associated with a low amount of soot on the sensor, maximized at a parallel resistor value such that any amounts of soot below a threshold have a constant resistance output. Further referencing FIG. 6, high amounts of soot may be associated with a low resistance, minimized at a series resistor value such that any amounts of soot above a threshold have a constant resistance output.

In certain embodiments, the procedure includes an operation to compensate the particulate sensor input value. The compensation occurs for system conditions that may be causing an offset or incorrect sensor reading but that can be modeled or corrected.

In certain embodiments, the compensating operation includes adjusting a sensor output function in response to one of an exhaust temperature and a sensor element temperature, where the sensor output function comprises an amount of soot as a function of a raw particulate sensor input value. For example, changes in the temperature of the sensor element induce changes in the resistance values of the metal in the sensor element. Further, changes in the temperature of the soot on the sensor element induce changes in the resistance response of the sensor to soot loading. For example, the resistance change of the loading sensor with respect to temperature can be determined, and used to calibrate the compensation to either the sensor element temperature, the exhaust gas temperature, or both.

In certain embodiments, the compensation operation includes determining an amount of soot oxidized by $NO_x$ (noxidation), and performing one of freezing (or holding) the particulate sensor input value, increasing a filter time constant of the particulate sensor input value, and providing an offset to the particulate sensor input value in response to the noxidation. The compensation of noxidation can be modeled according to the amount of $NO_x$ present in the exhaust gases, the temperature of the exhaust gases, and the ratio of NO to $NO_2$ in the NO determined by the engine characteristics and the presence and operating temperature of an upstream oxidation catalyst, if any. In certain embodiments, noxidation compensation is omitted where a $NO_x$ treatment device is upstream of the particulate sensor, and noxidation compensation functions in a similar manner to soot blow off compensation, and can be included with or function in conjunction with the soot blow off compensation.

The procedure further includes filtering the compensated particulate sensor input value. The filtering includes using a low-pass filter having frequency characteristics determined as a function of exhaust flow velocity and exhaust gas temperature. For example, the filtering may be performed to allow soot detection response with a time constant related to an expected soot accumulation rate, where the expected soot accumulation rate may be the highest expected soot output of the engine assuming a completely failed particulate filter. In many cases, a filtering time constant of a few seconds up to a minute is sufficient, but time constants lower than a few seconds or greater than a minute are also contemplated herein according to the specific characteristics of a system.

In certain embodiments, the procedure further includes determining a soot accumulation value in response to the filtered compensated particulate sensor input value. An exemplary operation to determine the soot accumulation value includes counting particulate sensor regeneration events that occur during a specified period of time or a specified testing period. For example, the specified time period may include a time period where, with a properly functioning particulate filter, the particulate sensor will never regenerate (in response to soot buildup) more than a specified number of times (e.g. two times). The number of regeneration events and the specified time are functions of the characteristics of the particular sensor, the soot output of the engine, the filtering efficiency of the particulate filter, and the acceptable degradation of the particulate filter. Another exemplary procedure includes counting particulate sensor temperature excursions that occur during a specified period of time or a specified testing period, where the sensor temperature excursions are understood to be regeneration events of the particulate sensor.

Another exemplary procedure includes counting a number of particulate sensor threshold value events that occur when the particulate sensor temperature is between an upper threshold and a lower threshold during a specified period of time or a specified testing period. For example, referencing FIG. 5, an upper threshold a2 and a lower threshold a2 are the temperature thresholds, and a time series of temperature-signal points are illustrated for a particulate sensor. An exemplary upper threshold a2 includes a highest temperature that occurs during a particulate sensor regeneration, and an exemplary lower threshold a1 includes a temperature low enough to allow observation of a start of regeneration for the particulate filter. Where the sensor has an excursion with a signal value higher than a threshold, a soot accumulation event is counted. In the illustration of FIG. 5, the sensor signal value falls after an accumulation event due to a regeneration of the particulate sensor.

Another exemplary procedure includes determining whether a minimum time elapses without a particulate sensor regeneration event occurring, where the expiration of the minimum time without a regeneration event indicates a properly operating particulate filter. Yet another exemplary procedure includes determining whether a rate of change of the filtered compensated particulate sensor input value is greater than a threshold value. The rate of change may be determined from an averaged rate of change over a specified period of time or a specified testing period, an instantaneous rate of change (e.g. any observed rate of change value exceeding the threshold), a filtered instantaneous rate of change (e.g. filtered to eliminate anomalous readings, such as a filter time constant that is between several times the sensor sampling rate to a few seconds), and a maximum rate of change observed during a specified period of time or a specified testing period.

The procedure further includes an operation to determine whether a set of diagnostic enable conditions are active. Exemplary diagnostic enable conditions include determining that a passive regeneration amount is below a threshold and/or determining that a system fault is not present. The passive regeneration is any presence of exhaust conditions that may cause particulate sensor regeneration without an intention to cause the regeneration. Examples include a high $NO_2$ amount present in the exhaust that can regenerate soot from the sensor even at relatively low temperatures, a high temperature in the exhaust, and oxygen in the exhaust with a high enough temperature to passively regenerate the particulate sensor. The system fault includes a present indicated failure of any sensor, signal, or device that renders the determinations of the diagnostic unreliable—for example and without limitation a failure of a temperature sensor, a sensor affecting an exhaust flow determination, or other system failure.

The procedure further includes, in response to the active diagnostic enable conditions and the soot accumulation value, determining a particulate filter diagnostic value and providing the particulate filter diagnostic value to an output device. In certain embodiments, the operation to determine the particulate filter diagnostic value includes determining the particulate filter diagnostic value as PASSED (or other value indicating a non-failed particulate filter) in response to the soot accumulation value being below a threshold. In certain embodiments, the operation to determine the particulate filter diagnostic value includes determining the particulate filter diagnostic value as FAILED (or other value indicating a not properly functioning particulate filter) in response to the soot accumulation value being above a threshold. Providing the particulate filter diagnostic value to an output device includes storing a fault value on an engine control unit (ECU), providing a fault value to a datalink, providing a fault value to a diagnostic tool, and/or lighting a lamp such as a maintenance lamp or a malfunction indicator lamp.

Another exemplary procedure includes performing the operation to determine the soot accumulation value in response to the filtered compensated particulate sensor input value by determining a soot throughput of a particulate filter as a function of the filtered compensated particulate sensor input value. In certain embodiments, determining the soot throughput of the particulate filter includes operating a transfer function on the particulate sensor filtered compensated signal to provide an output value of mass of soot flowing through the particulate filter. For example, referencing FIG. 6, accounting for the diameter of the exhaust pipe, a transfer function provides grams of soot in the exhaust pipe based on the resistance value of the sensor. At a high resistance position in the example, a resistor is wired in parallel with the particulate sensor to provide the particulate sensor input value. The parallel resistor caps the output value of the particulate sensor-resistor system, and may be set at a value where, at soot throughput values below the capped output point, the DPF is operating properly.

In certain embodiments, the soot throughput is determined as a normalized mass of soot—a mass of soot against which the diagnostic is calibrated but that is not necessarily descriptive of a particular amount of soot on the sensor or in the exhaust pipe at a given time. The procedure further includes determining the soot throughput as a normalized mass of soot by determining a soot mass operating curve as a function of an exhaust flow velocity and an exhaust temperature (e.g. as illustrated in FIG. 6), and determining the soot throughput in response to the filtered compensated particulate sensor input value and the soot mass operating curve. The soot mass operating curve may include a first constant output for at least a portion of conditions where the DPF is functioning properly (the flat portion on the left clamped by the parallel resistor). The soot mass operating curve may include a second constant output for at least a portion of conditions where the DPF is failed (the flat portion on the right, which may be clamped by a parallel resistor). In one example, a parallel resistor is included which provides a low-end clamp for the resistance.

The difference between the parallel resistor and the series resistor, and the ratio of the resistance values to the operating resistance values of the particulate sensor, define the shape of the curve in FIG. 6. The settings of the resistors, where present, affect the resolution and sensitivity to particulate sensor values, the resolution and sensitivity to the normalized soot mass value, and the range of resistance (or voltage or current) values that must be detectable by the control unit reading the sensor. The values provided with a 7 mega-Ohm parallel resistor and a 100 k-Ohm series resistor are exemplary and non-limiting. In certain embodiments, the procedure includes an operation to determine the soot mass accumulated for a specified time period in response to the soot throughput, and to determine the particulate filter diagnostic value further in response to the soot mass accumulated.

A number of additional exemplary embodiments shall now be described. An exemplary procedure includes counting the number of sensor regenerations and/or the number of times the sensor signal reaches a particular threshold, or the slope of the sensor signal, or a combination of different sensor signal processing approaches to detect DPF failure.

The procedure include a check of "enable conditions" to determine conditions that avoid low signal-to-noise ratio (SNR) conditions. For example, if the particulate filter is regenerating then it is possible that the particulate matter or ash from the particulate filter is blowing out from it and this can be picked up by the particulate sensor. To avoid treating a particulate filter regeneration event as a particulate filter failure event, the algorithm is disabled during particulate filter regeneration. When the sensor itself regenerates, the sensor is not actively accumulating soot and hence the signal may not be used during this time. If the key-on event occurs in a cold start condition, then there is a possibility of the sensor catching the moisture in the exhaust and/or immediately after the key-on event (or engine start), and the signal is accordingly ignored in the exemplary procedure.

The procedure includes a "compensations" operation including includes a soot blow off compensation, a temperature compensation, and a $NO_x$ impact compensation.

Exemplary soot blow off compensation. During transient engine operation there is a possibility of the soot blowing off from the sensing element due to a sudden increase in exhaust flow. This blown off soot causes an error in the actual accumulated soot. As illustrated in FIG. 4, the raw signal and signal compensated for soot blow off can be very different and these compensations are performed for robust detection of failed filters.

Exemplary temperature compensation. The conductivity of soot accumulating on the sensor element changes with temperature. Temperature change can cause change in resistance of the metal electrode as well as change in resistance of soot. Hence compensating the particulate sensor signal for temperature is performed in the exemplary procedure.

Exemplary $NO_x$ impact compensation. The soot accumulated on the sensing element can be oxidized dependent upon the amount of $NO_x$ in the exhaust and the temperature of the exhaust gases at the sensor. The compensation to account for the soot accumulated on the element but oxidized due to $NO_x$ is specifically important when the $NO_x$ level in the exhaust is high where the particulate sensor is placed. This can happen in an architecture where the particulate sensor is installed after the particulate filter, but before any $NO_x$— after-treatment system, and/or during times where a $NO_x$ after-treatment system is not presently operating efficiently.

The exemplary procedure further includes a "filtering" operation that includes filtering the compensated particulate sensor signal to eliminate any noise/spikes in the signal and to get a smooth signal utilizing a low-pass filter whose frequency characteristics are a function of the different operating conditions including exhaust flow-velocity and temperature. The filter may be a moving average filter based on recent sensor samples, a low-pass filter, or other filter known in the art.

The procedure further includes operations to determine an amount of particulate matter passing through the particulate filter without being trapped. A particulate sensor regeneration threshold is determined by determining a particulate sensor regeneration event by monitoring the particulate sensor signal and determining when the signal crosses the predetermined regeneration threshold. If the sensor element temperature is known, then the sensor regeneration event alternatively or additionally can be determined from the sensor temperature. Referencing FIG. 5, the temperature curve 510 of the particulate sensor illustrates an excursion 512 indicating a regeneration event. Referencing FIG. 7, a sensor signal returns to a nominal cleaned sensor position following a regeneration event (see curves 704, 706).

Referencing the bottom plot of FIG. 5, a scatter plot is illustrated of particulate sensor's signal against the sensing element temperature. Alpha 1 and alpha 2 are the threshold limits on the temperature signal. An exemplary alpha 2 is the highest temperature the sensor element reaches when the sensor element is regenerating. An exemplary alpha 1 is the lower threshold limit on temperature, for example a value below alpha 2, but high enough to determine a start of sensor regeneration. Determining that the particulate sensor signal is near the threshold value 506 and the temperature is between the limits alpha 1 and alpha 2 is an exemplary operation to determine an active sensor regeneration event.

Another exemplary operation to determine the amount of particulate matter passing through the particulate filter includes determining a slope of the particulate sensor signal (e.g. reference FIG. 7 curves 702, 704, 706). The rate of change of the integrating type particulate sensor signal can be correlated to the amount of soot passing through the pipe. For a failed particulate filter, the soot mass flow will be higher and hence will result in steeper signal slope—c.f. curve 704 to curve 706, while for a healthy filter the soot flow-rate through the particulate filter is small (e.g. as specified by emissions regulations) and hence even if the particulate sensor signal changes, it will change slowly (i.e. with a shallow signal slope), for example as shown at curve 702.

The exemplary procedure further includes an operation to determine enable conditions of the diagnostic algorithm. The operation to determine enable conditions ensures that the signal from the sensor used for failure detection is providing relevant information and the operating conditions allow detection of particulate filter failure while minimizing false failure detection. Conditions where passive regeneration occurs more rapidly than what can be reliably compensated (e.g. determined by exhaust gas temperature and $NO_x$ levels), or conditions where the particulate sensor signal is not reliable due to an engine or aftertreatment component failure act as algorithm disable conditions.

An exemplary algorithm execution strategy includes:

Poll the key input values, such as accumulated soot signal and sensing element temperature signal of the particulate sensor, catalyst/exhaust temperature and mass-flow rate, as well as other possible factors related to particulate filter catalyst short-term history (e.g., average temperature over the last minute, etc.).

Determine if conditions are favorable for proper particulate filter catalyst operation (catalyst is sufficiently warm, space velocity is sufficiently low) and initial enable conditions are met.

Compensate the signal for soot blow off, temperature, and/or noxidation.

Filter the compensated signal.

Determine the number of sensor active regeneration events and/or slope of the compensated and filtered sensor signal.

Determine if the diagnostic algorithm enable conditions are met (e.g. if the particulate filter and particulate sensor are not passively regenerating beyond compensation capability, such as temperature below specific value e.g. 500° C.), check for presence of fault values.

Collect the information over time, interpret it, and output in the form of a malfunction indicator light, error message, fault code, datalink communication, etc., as follows:

If number of sensor regeneration events>specific value within some predetermined time: particulate filter failed causing soot to flow through out to exhaust.

If slope of sensor signal>specific value for some predetermined time: particulate filter is failed causing soot to flow through out to exhaust.

If either one or both of the above do not occur for some predetermined amount of time: particulate filter is passed and is operating acceptably.

Another exemplary algorithm execution strategy includes:

Apply the initial enable conditions.

Compensate for soot blow off, temperature, and/or noxidation.

Filter the compensated particulate sensor signal.

Convert the particulate sensor signal into grams of soot flowing past the particulate sensor which is installed in an exhaust pipe of a specific diameter (e.g., 5" diameter exhaust pipe) by passing the filtered compensated signal through a transfer function block which converts the particulate sensor signal to the amount of soot flowing past the particulate sensor for given exhaust temperature and flow velocity. This calculation may be adjusted for a given exhaust pipe diameter. FIG. 6 provides an example of how the change in particulate sensor resistance can be correlated to an amount of soot flowing in the exhaust pipe for given temperature and flow conditions. This transfer function also addresses the cross sensitivity issue of the sensor signal to exhaust temperature and flow.

Convert the signal in grams of soot to determine particulate filter failure as follows:

Determine if the diagnostic algorithm enable conditions are met (E.g. if the particulate filter and particulate sensor are not passively regenerating beyond compensation capability, such as temperature below specific value e.g. 500° F.), check for presence of fault values.

Collect the information over time, interpret it, and output in the form of a malfunction indicator light, error message, fault code, datalink communication, etc., as follows:

If grams of soot flowing through the pipe as determined from particulate sensor signal>specific value within some predetermined time: particulate filter failed causing soot to leak out to exhaust.

If grams of soot flowing through the pipe as determined from particulate sensor signal<specific value for some predetermined time: particulate filter passed and is operating acceptably.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining whether a particulate sensor particulate stability condition is present for a particulate sensor downstream of a particulate filter;
   determining a particulate sensor input value;
   in response to the particulate sensor particulate stability condition, compensating the particulate sensor input value, filtering the compensated particulate sensor input value, and determining a soot accumulation value in response to the filtered compensated particulate sensor input value;
   determining whether a diagnostic enable condition is active;
   in response to the active diagnostic enable condition and the soot accumulation value, determining a state of the particulate filter; and
   providing the state of the particulate filter to an output device.

2. The method of claim 1, wherein the particulate sensor input value is indicative of an amount of soot accumulated on a particulate sensor element.

3. The method of claim 1, wherein the determining whether the particulate sensor particulate stability condition is present comprises performing at least one operation selected from the operations consisting of:
   determining that the particulate filter is not regenerating;
   determining that the particulate sensor providing the particulate sensor input value is not regenerating;
   determining that the particulate sensor providing the particulate sensor input value is not regenerating due to a $NO_x$ mechanism;
   determining that a predetermined wait time has elapsed since one of a vehicle key-on event and an engine start event; and
   determining that an exhaust moisture condition is not present.

4. The method of claim 1, wherein the compensating the particulate sensor input value comprises performing at least one operation selected from the compensations consisting of:
   determining whether an exhaust flow rate transient event greater than a transient threshold has occurred, and freezing the particulate sensor input value in response to the exhaust flow rate transient event;
   determining whether the exhaust flow rate transient event greater than the transient threshold has occurred, and increasing a filter time constant of the particulate sensor input value in response to the exhaust flow rate transient event;
   determining whether the exhaust flow rate transient event greater than the transient threshold has occurred, and providing an offset to the particulate sensor input value in response to the exhaust flow rate transient event;
   determining if an unfiltered particulate sensor input value experiences an anomalous change in response to the unfiltered particulate sensor input value changing than an anomaly threshold amount within less than an anomaly threshold time, and providing an apparent unfiltered particulate sensor input value in response to the anomalous change, wherein the apparent unfiltered particulate sensor input value comprises one of the unfiltered particulate sensor input value with a reduced change value and the unfiltered particulate sensor input value with an eliminated change value;
   adjusting a sensor output function in response to one of an exhaust temperature and a sensor element temperature, the sensor output function comprising an amount of soot as a function of the raw particulate sensor input value; and determining an amount of soot oxidized by NOx (noxidation), and providing a noxidation compensated particulate sensor input value in response to the noxidation, wherein the noxidation compensated particulate sensor input value comprises the particulate sensor input value frozen at a previous value, the particulate sensor input value determined with an increased filter time constant, and the particulate sensor input value provided with a noxidation offset value.

5. The method of claim 1, wherein the filtering the compensated particulate sensor input value comprises filtering with a low-pass filter having frequency characteristics determined as a function of exhaust flow velocity and exhaust gas temperature.

6. The method of claim 1, further comprising determining a soot accumulation value in response to the filtered compensated particulate sensor input value according to at least one soot determination algorithm selected from the soot determination algorithms consisting of:

counting particulate sensor regeneration events that occur during a specified period of time or a specified testing period;

counting particulate sensor temperature excursions that occur during a specified period of time or a specified testing period;

counting a number of particulate sensor threshold value events that occur when the particulate sensor temperature is between an upper threshold and a lower threshold during a specified period of time or a specified testing period; and determining whether a minimum time elapses without a particulate sensor regeneration event occurring.

7. The method of claim 1, wherein determining a soot accumulation value in response to the filtered compensated particulate sensor input value comprises determining whether a rate of change of the filtered compensated particulate sensor input value is greater than a conforming filter threshold value.

8. The method of claim 7, wherein the rate of change of the filtered compensated particulate sensor input value comprises a rate of change selected from the rates of change consisting of: an averaged rate of change over a specified period of time, an instantaneous rate of change, a filtered instantaneous rate of change, and a maximum rate of change observed during a specified period of time.

9. A method for determining whether a particulate filter is operating properly, the method comprising:

determining whether a particulate sensor particulate stability condition for a particulate sensor is present;

determining a particulate sensor input value, compensating the particulate sensor input value, filtering the compensated particulate sensor input value, and determining a soot accumulation value in response to the filtered compensated particulate sensor input value;

determining whether a set of diagnostic enable conditions are active;

in response to the particulate sensor particulate stability condition, the active diagnostic enable conditions, and the soot accumulation value, determining a state of the particulate filter; and providing the state of the particulate filter to an output device.

10. The method of claim 9, wherein determining a soot accumulation value in response to the filtered compensated particulate sensor input value comprises determining a soot throughput of the particulate filter as a function of the filtered compensated particulate sensor input value.

11. The method of claim 10, wherein the soot throughput comprises a normalized mass of soot.

12. The method of claim 11, wherein determining the soot throughput as a normalized mass of soot comprises determining a soot mass operating curve as a function of an exhaust flow velocity and an exhaust temperature, and determining the soot throughput in response to the filtered compensated particulate sensor input value and the soot mass operating curve.

13. The method of claim 12, wherein the soot mass operating curve provides a first constant output in response to an amount of soot on the particulate sensor being lower than first threshold soot value.

14. The method of claim 13, further comprising determining a specified resistance value, and wiring a resistor having the specified resistance value in parallel with the particulate sensor, wherein the determining the specified resistance value comprises determining a resistance value such that the soot mass operating curve provides an output lower than the first constant output at a soot loading value on the particulate sensor that is below a failed particulate filter soot loading value.

15. The method of claim 12, wherein the soot mass operating curve provides a second constant output in response to the amount of soot on the particulate sensor being greater than the second threshold soot value.

16. An apparatus, comprising:

a particulate stability module structured to interpret a particulate stability condition associated with a particulate sensor downstream of a particulate filter in an exhaust system;

a particulate sensor processing module structured to interpret a particulate sensor input value from the particulate sensor when the particulate stability condition is present, the particulate sensor processing module being further structured to interpret a particulate sensor temperature, to compensate the particulate sensor input value in response to the particulate sensor temperature, and to filter the compensated particulate sensor input value;

a particulate determination module structured to determine a soot accumulation value in response to the filtered compensated particulate sensor input value;

a diagnostic screening module structured to interpret a diagnostic enable condition; and a particulate sensor diagnostic module structured to determine a state of the particulate filter in response to the diagnostic enable condition and the soot accumulation value, and to provide the state of the particulate filter to an output device.

17. The apparatus of claim 16, further comprising a soot blowoff module structured to interpret soot blowoff conditions, and wherein the particulate sensor processing module is further structured to compensate the particulate sensor input value in response to the soot blowoff conditions.

18. The apparatus of claim 16, wherein the particulate stability module is further structured to interpret the particulate stability condition through at least one of the operations consisting of:

determining that the particulate filter is not regenerating;

determining that the particulate sensor providing the particulate sensor input value is not regenerating;

determining that the particulate sensor providing the particulate sensor input value is not regenerating due to a $NO_x$ mechanism;

determining that a predetermined wait time has elapsed since one of a vehicle key-on event and an engine start event; and determining that an exhaust moisture condition is not present.

19. The apparatus of claim 16, wherein the particulate determination module is further structured to determine the soot accumulation value in response to the filtered compensated particulate sensor input value by determining a soot throughput of the particulate filter as a function of the filtered compensated particulate sensor input value.

20. The apparatus of claim 16 wherein the particulate determination module is further structured to determine the soot throughput as a normalized mass of soot by determining a soot mass operating curve as a function of an exhaust flow velocity and an exhaust temperature, and further determining the soot throughput in response to the filtered compensated particulate sensor input value and the soot mass operating curve.

21. The apparatus of claim 20, wherein the soot mass operating curve provides a first constant output in response to an amount of soot on the particulate sensor being lower than first threshold soot value.

22. The apparatus of claim 20, wherein the soot mass operating curve provides a second constant output in response to the amount of soot on the particulate sensor being greater than a second threshold soot value.

23. A system, comprising:
an internal combustion engine producing an exhaust stream;
a particulate filtering device fluidly coupled to the engine with the exhaust stream passing therethrough;
a particulate sensor operatively coupled to the exhaust stream at a position downstream of the particulate filtering device;
a temperature sensor operatively coupled to the exhaust stream;
a controller connected to the particulate sensor and the temperature sensor, the controller comprising:
a particulate stability module structured to interpret a particulate stability condition associated with the exhaust stream at the particulate sensor;
a particulate sensor processing module structured to interpret a particulate sensor input value from the particulate sensor in response to the particulate stability condition being present, the particulate sensor processing module further being structured to interpret a particulate sensor temperature, to compensate the particulate sensor input value in response to the particulate sensor temperature, and to filter the compensated particulate sensor input value;
a particulate determination module structured to determine a soot accumulation value in response to the filtered compensated particulate sensor input value;
a diagnostic screening module structured to interpret a diagnostic enable condition; and
a particulate sensor diagnostic module structured to determine a state of the particulate filtering device in response to the diagnostic enable condition and the soot accumulation value, and to provide the state of the particulate filtering device to an output device.

24. The system of claim 23, wherein the particulate stability module is further structured to interpret the particulate stability condition through at least one of the operations consisting of:
determining that the particulate filtering device is not regenerating;
determining that the particulate sensor is not actively regenerating;
determining that the particulate sensor is not regenerating due to a $NO_x$ mechanism;
determining that a predetermined wait time has elapsed since one of a vehicle key-on event and an engine start event; and
determining that an exhaust moisture condition is not present in the exhaust stream.

25. The system of claim 23, wherein the particulate determination module is further structured to determine the soot accumulation value in response to the filtered compensated particulate sensor input value by determining a soot throughput of the particulate filtering device as a function of the filtered compensated particulate sensor input value.

26. The system of claim 25 wherein the particulate determination module is further structured to determine the soot throughput as a normalized mass of soot by determining a soot mass operating curve as a function of an exhaust flow velocity and an exhaust temperature, and further determining the soot throughput in response to the filtered compensated particulate sensor input value and the soot mass operating curve.

27. The system of claim 26, wherein the soot mass operating curve provides a first constant output in response to an amount of soot on the particulate sensor being lower than first threshold soot value.

28. The system of claim 27, further comprising a resistor having a specified resistance value wired in parallel with the particulate sensor, the specified resistance value comprising a resistance value such that the soot mass operating curve provides an output lower than the first constant output at a soot loading value on the particulate sensor that is below a failed particulate filter soot loading value.

29. The system of claim 27, wherein the soot mass operating curve provides a second constant output in response to the amount of soot on the particulate sensor being greater than the second threshold soot value.

* * * * *